United States Patent [19]

Gaudreau

[11] Patent Number: 4,716,003
[45] Date of Patent: Dec. 29, 1987

[54] APPARATUS AND METHOD FOR REDUCING NECK WASTE IN A CAST VINYL SHELL

[75] Inventor: Laurent R. Gaudreau, So. Berwick, Me.

[73] Assignee: Ex-Cell-O Corporation, Walled Lake, Mich.

[21] Appl. No.: 865,991

[22] Filed: May 22, 1986

[51] Int. Cl.⁴ .................... B29C 41/04; B29C 41/46
[52] U.S. Cl. ................... 264/302; 264/327; 425/435; 425/447; 249/108; 249/111
[58] Field of Search ............. 264/302, 303, 306, 301, 264/327; 249/108, 111; 425/435, 447

[56] References Cited

U.S. PATENT DOCUMENTS

| | | | |
|---|---|---|---|
| 3,059,281 | 10/1962 | Visser et al. | 264/302 |
| 3,698,849 | 10/1972 | Czerski | 425/449 |
| 4,562,025 | 12/1985 | Oray | 425/434 |
| 4,606,868 | 8/1986 | Christoph et al. | 264/302 |

Primary Examiner—Jan H. Silbaugh
Assistant Examiner—James Bartholomew
Attorney, Agent, or Firm—John C. Evans

[57] ABSTRACT

Apparatus for reducing the waste neck area in a mold of vinyl cast articles such as automotive arm rests, head rests and parts of similar construction includes a powder box of gellable material having a supply spout with its exposed outer surface area covered by a liner of heat insulating material; a waste inlet neck on a heated, machined nickel mold is sealed by the liner when the powder box is joined to the mold. The powder box spout is at room temperature and shields the inlet neck to prevent gel build-up on the inlet neck to effect considerable cost by both a reduction in waste deposits of gel and a reduction in labor required to trim a waste area on the mold. To obtain the coating, the mold is coated with powdered vinyl (hereinafter gellable material) by casting from the powder box to the mold and the excess material is removed from the mold by dumping it from the mold into the powder box.

6 Claims, 7 Drawing Figures

APPARATUS AND METHOD FOR REDUCING NECK WASTE IN A CAST VINYL SHELL

BACKGROUND OF THE INVENTION (1) Field of the Invention

This invention relates to an apparatus and a method for molding hollow thin-walled articles from a gellable material such as vinyl plastisol.

Various vinyl plastisol compositions are known which can be used in various powdered vinyl molding processes. Typically, an open hollow mold is covered by dry plastisol and heat is applied to the mold surface and transferred to the dry plastisol to gel a layer of plastisol adjacent the mold surface. The thickness of the gelled layer depends upon the temperature to which the plastisol layer is subjected and the time the plastisol is maintained at that temperature. After the layer adjacent the mold surface is gelled, the ungelled plastisol is poured out of the mold. In such processes, certain mold configurations may have surfaces thereon in which deposited material is later disposed of as scrap or trim waste.

(2) Description of the Prior Art

Articles which are manufactured by vinyl cast on a heated mold often include salvage or trim areas which are not used in the final product and therefore do not require the thickness of the other finished areas in the product. Yet, when the entire mold surface is heated uniformly the entire finished article has approximately the same thickness even though some areas are trim or non-usable. There is known in the slush molding art the technique of varying the thickness by heating different areas of the mold to a higher degree to increase the thickness of the article in certain areas. Such a technique is exemplified in U.S. Pat. No. 2,588,571 granted to Sydney Porter on Mar. 11, 1952. That patent discloses the technique of slush molding a boot by utilization of infrared lamp heating and shielding the heating from certain portions of the mold to prevent the build-up of the plastisol thickness and to increase the thickness of the sole of the boot by increased heating.

Another apparatus for controlling waste build-up on a mold is formed in a mold having first and second groups of liquid passages disposed adjacent the mold surface for controlling the temperature over respective first and second areas of the mold surface as set forth in U.S. Pat. No. 4,217,325 granted to D. E. Colby on Aug. 12, 1980 with a common assignee. The first group of liquid passages are disposed adjacent the first area of the mold surface where it is desired to increase the thickness of the finished article whereas the second group of passages is disposed adjacent the second area of the mold surface where the material in the finished article is scrapped and/or will be trimmed and therefore the desired thickness is desirably less. Both the first and second groups of passages are supplied with liquid to maintain the temperature of the first and second areas of the mold surface at a non-gelling temperature as liquid plastisol is disposed over the mold surface to define a coating or layer. This very thin coating of plastisol is applied to be free of surface blemishes. Thereafter, additional liquid plastisol is provided for increasing the thickness only over the first area of the mold surface. To accomplish this, the first group of passages is supplied with a liquid at a temperature higher than the non-gelling temperature of the liquid in the second group of passages for heating the first area of the mold surface to a higher temperature than the second area so as to gel the liquid plastisol over the first area of the mold surface which is heated with the heat supplied by the liquid in the first group of passages. After the desired gelled thickness is attained, all passages are supplied with liquid at a temperature sufficient to heat the first and second areas of the mold to a cure temperature for curing all of the plastisol. Accordingly, the finished article will have a greater thickness over the first area which defines the finished area of the article whereas the thickness of the article over the second area of the mold surface will be much thinner and define the scrap or trim areas. Consequently, significant amounts of material are saved.

Still another method of controlling the build-up of gelled material on a mold surface is set forth in U.S. Ser. No. 673,810 filed Nov. 21, 1984 for Gas Conditioned Modular Slush Molding Machine. In the '810 case, the control of waste build-up is accomplished by selective control of air flow from a heated plenum through elongated tubes with nozzles that impinge heated air onto exposed surfaces of the mold.

U.S. Pat. No. 3,698,849 discloses an injection molding nozzle with an insulating gasket that enables the nozzle to remain seated on a sprue bush during the whole of a molding cycle.

SUMMARY OF THE INVENTION

The subject invention provides an improved method and apparatus to eliminate neck waste on an article made by a powdered vinyl molding process by use of a heated mold having an inlet neck through which powder is cast onto the mold surface. A powder box has an insulated pour spout which shields the inlet area of the mold so that waste neck material in the finished article to be scrapped or to be trimmed will be reduced. The mold is heated to a gelling temperature. Plastisol is distributed from the spout over the heated mold surface to produce a coating or layer of gelled material on the mold surface. A heat resistant liner on the spout covers the inlet neck so that no waste build-up occurs.

PRIOR ART STATEMENT

The U.S. Pat. No. 3,698,849 discussed above discloses a thermal gasket in an injection mold nozzle but there is no suggestion of utilizing a barrier of heat resistant material on a powder box pour spout located to shield a neck area of the mold for preventing material waste build-up on the mold and to eliminate neck scrap on the finished part. The above-mentioned U.S. Pat. No. 3,680,629 suggests the use of liquid passages adjacent the mold surface for controlling the temperature of the mold, however, there is no suggestion in that patent of the apparatus or method of the present invention. As alluded to above in regard to U.S. Pat. No. 2,588,571, the technique of varying the thickness by differential heating is known in the slush molding art, however, such is accomplished by infrared heating. There has been no recognition in the prior art of the advantages of utilizing a thermal barrier of heat resistant material on a powder box pour spout to prevent waste on an adjacent mold surface. Other processes using hot gas to mold plastic parts are set forth in U.S. Pat. Nos. 3,578,066; 3,590,435; 3,492,307; 3,416,913 and 3,388,429. However, none of the processes use the system of the present invention to reduce the waste neck area in dry vinyl casting process.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
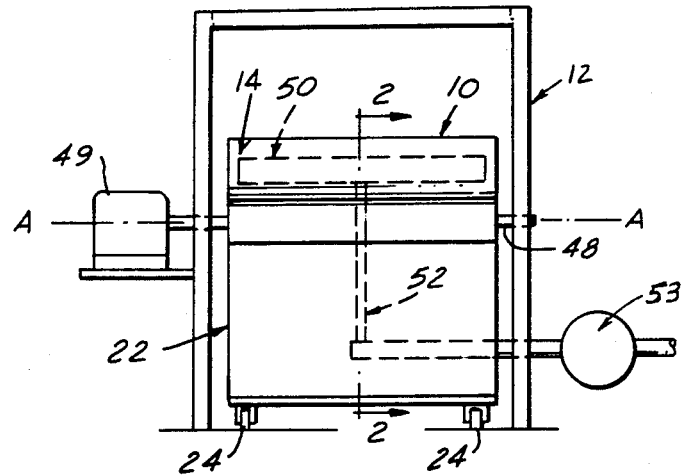
FIG. 1 is a diagrammatic view of an assembly constructed in accordance with the subject invention.
Figure 2:
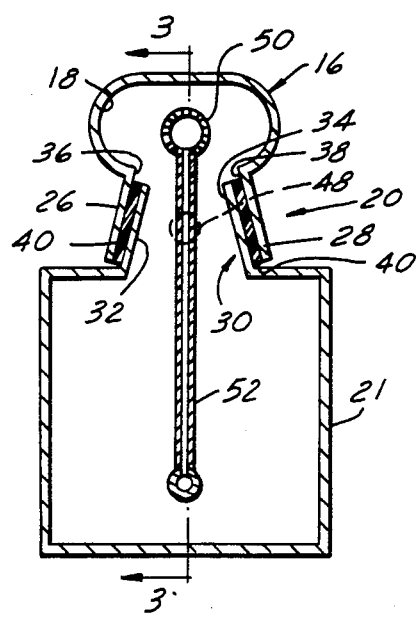
FIG. 2 is an enlarged sectional view taken along line 2—2 of FIG. 1 looking in the direction of the arrows.
Figure 3:
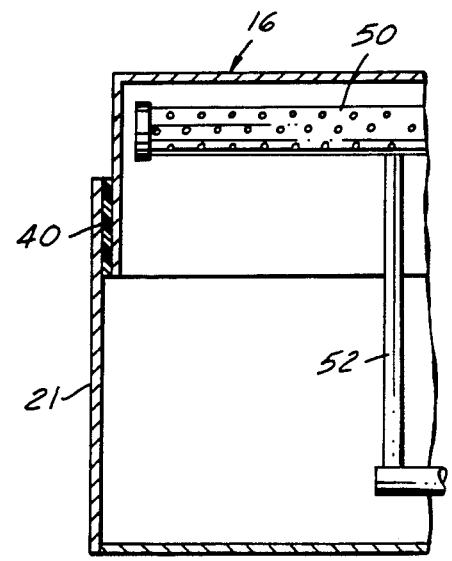
FIG. 3 is a sectional view taken along line 3—3 of FIG. 2 looking in the direction of the arrows.

FIG. 1 shows an assembly generally indicated at 10 and constructed in accordance with the subject invention. The assembly 10 includes a stationary pedestal generally indicated at 12 for rotatably supporting a mold support box generally indicated at 14. The pedestal 12 rotatably supports the mold support box 14 for rotation about the axis A—A. The mold support box 14 receives and supports a mold 16. The mold 16 has a mold surface 18 and includes a waste inlet neck 20.

The assembly 10 also includes a movable modular unit generally shown at 22 with a powder box 21 for supplying gellable material such as plastisol or powder material to the open mold 16. The unit 22 is supported on a plurality of rollers 24. The entire unit 22 and is normally disposed under the mold support box 14 when the unit 22 is in the operating position illustrated in FIG. 1 relative to the pedestal 12 for receiving plastisol emptied from the mold 16 as the mold 16 is rotated for dumping or emptying into the unit 22. As alluded to above, the mold 16 may be supplied with a different plastisol or the same plastisol of a different color merely by moving the modular unit 22 away from the mold and inserting or placing a different modular unit in position having a different plastisol.

The modular unit 22 includes a powdered plastisol supply for supplying plastisol to the mold surface 18 of the mold 16 and for retrieving plastisol emptied or dumped from the mold 16. The rollers 24 define a conveyance means for facilitating the movement of the unit 22 away from the pedestal 12 and the mold support box 14.

The mold 16 is heated by suitable means, not shown, so that the plastisol deposited thereon will gel.

The mold box, supported by rotary joints at each end, bears the electroform mold 16 in the same manner as in U.S. Pat. No. 4,217,325 and is designed to accommodate a variety of molds. Further, the gellable material can be in the form of a powder as set forth more specifically in U.S. Pat. No. 4,562,025, issued Dec. 31, 1985 for Mold Method and Apparatus for Multi-Color Plastic Shells.

The waste inlet neck 20 is defined by a pair of divergent walls 26, 28 arranged at an angle that accommodates a thermally insulated pour spout 30 on the modular unit 22. The pour spout is maintained at a non-gelling temperature below that required to gel any appreciable thickness of material thereon.

More particularly, the insulated pour spout 30 includes a pair of convergent walls 32, 34 that are dimensioned to cover the inside surfaces 36, 38 of each of the walls 26, 28 when the modular unit 22 is joined to the heated mold 16.

A liner gasket 40 of heat insulating material such as silicone or polytetra fluoroethylene covers the outside surfaces of the pour spout 30. The liner gasket 40 defines a sealing surface between the pour spout 30 and the neck 20.

The powder box 21 of the modular unit and the silicone liner gasket 40 are at room temperature when they are joined to the heated mold. Consequently, powder distributed through the mold will not gel on the waste inlet neck 20 of the mold. For purposes of this description, the mold surface 18 represents a finished polyvinyl cast product such as an automotive armrest, headrest or parts of similar construction. The elimination of gel material on the waste neck area of the heated mold reduces material usage and also reduces labor required to trim waste from the finished part. The saved material and labor for trim represent a considerable cost savings.

Figure 4:
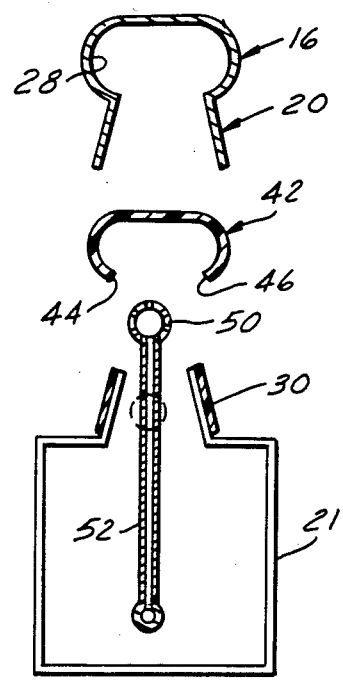
FIGS. 4-7 show various steps in the operation of the apparatus of FIGS. 1-3.

The process of the invention is set forth in FIGS. 4-7. FIG. 4 shows the mold 16 separated from the powder box 21 and with a finished vinyl part 42 released from the mold surface 18. The part 42 includes marginal edges 44, 46 that do not need to be trimmed.

Figure 6:
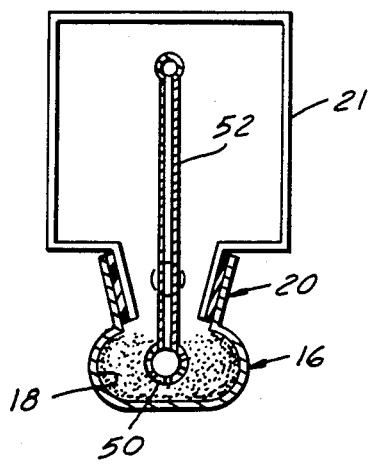
Figure 5:
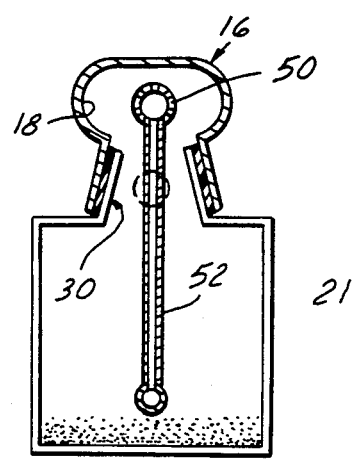
Figure 7:
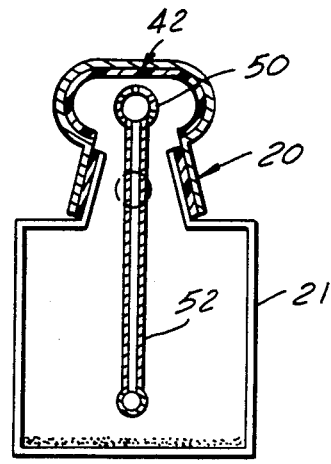

At the start of the next process sequence, mold 16 is preheated and the powder box 21 is raised from the lowered position in FIG. 4 and is joined to the heated mold 16 at the pour spout 30 and waste neck 20, as shown in FIG. 5. The joined box 21 and mold 16 are then rotated on suitable trunnions 48 by suitable drive means 49 (FIG. 1) and inverted as shown in FIG. 6. This causes powder in the box 21 to be cast onto the mold surface 18. The preheated mold is maintained at a temperature in the range of 250° F. to 290° F. for gelling the gellable material over the mold surface 18.

In the illustrated arrangement, a perforated air fluidizer tube 50 is carried on the powder box 21. It has an inlet 52 connected to an air source 53 which will direct air flow through the perforations in tube 50 to assist in distributing the powder evenly across the mold surface 18. The insulated pour spout 30 will prevent the powder from gelling on the waste neck 20 of the mold 16 to reduce costs of material and trim.

Following the distribution of material, the powder box 21 and heated mold are inverted so that excess nongelled powder will be dumped into the powder box 21 (FIG. 7) for recycling in subsequent process cycles. The gelled material remains on the mold surface 18 and the mold is then reheated to a temperature in the range of 350° F. to 400° F. for curing the gelled material.

The embodiments of the invention in which an exclusive property or privilege is claimed are defined as follows:

1. In a method for molding an article by depositing heat gellable material from a powder box joined to a preheated mold through a pour spout on the powder box and through a waste inlet neck on the preheated mold and wherein the joined powder box and mold are rotated as a unit to deposit the heat gellable material on a mold surface the improvement comprising:

maintaining the pour spout on the powder box at a non-gelling temperature below that required to gel any appreciable thickness of material thereon to prevent the deposition of gelled material thereon as it passes thereacross during rotation of the joined powder box and the preheated mold;

shielding the waste inlet neck from powder flow into the heated mold by inserting the pour spout through the waste inlet neck and in overlying relationship thereto whereby the gellable material is bypassed around the waste inlet neck as the gellable material is deposited on the mold surface during rotation of the joined powder box and preheated mold.

2. In the method of claim 1, maintaining the pour spout at ambient temperature by thermally insulating the outer surface thereof from radiant heat transfer from the preheated waste inlet neck of the preheated mold.

3. In an assembly for molding an article of heat gellable material in a preheated mold joined to a powder box having a supply of gellable material therein and rotated with the preheated mold to distribute the gellable material to and from the interior of the preheated mold and against a mold surface of the preheated mold to gel a thickness of the gellable material thereon the improvement comprising:

a waste inlet neck on said mold defining an entrance into the interior of the preheated mold;

a pour spout on said powder box directed through said waste inlet neck for shielding the waste inlet neck during flow of the gellable material both into and out of the interior of the preheated mold to prevent build up of gelled material on the waste inlet neck;

and means for maintaining said pour spout at a non-gelling temperature below that required to gel any appreciable thickness of material thereon when the powder box is joined to said preheated mold thereby to prevent deposition of the gelled material on the pour spout as it is passed to and from the powder box during rotation of the joined powder box and preheated mold.

4. In the combination of claim 3, said means for maintaining said pour spout at ambient temperature including liner means interposed between said pour spout and said waste inlet neck to prevent radiant heat flow therefrom to said pour spout.

5. In the combination of claim 3, said pour spout having an outer surface, said liner means including a layer of thermal insulating material covering substantially all of said outer surface.

6. In an assembly for molding an article of heat gellable material having a preheated mold with a mold surface and a waste inlet neck and a powder box joined to the preheated mold having a pour spout and a supply of the gellable material maintained at ambient temperature, the improvement comprising:

said pour spout including thermally insulated spout means located to extend through said waste inlet neck;

said thermally insulated spout means including first and second convergent walls defining inner and outer surfaces and heat insulating gasket means covering the outer surface for maintaining said spout at a non-gelling temperature below that required to gel any appreciable thickness of material thereon to prevent build-up of waste material on either the spout or said inlet neck as gellable material is transferred from the powder box to the heated mold for gelling on the preheated mold surface.

* * * * *